Aug. 2, 1955  R. B. DENIS  2,714,497
PIPE HANGER
Filed July 25, 1951
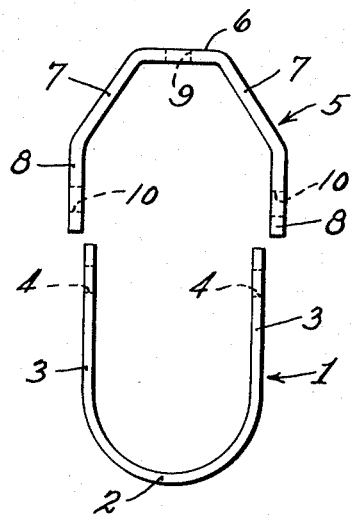
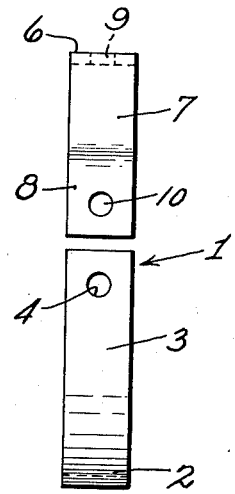
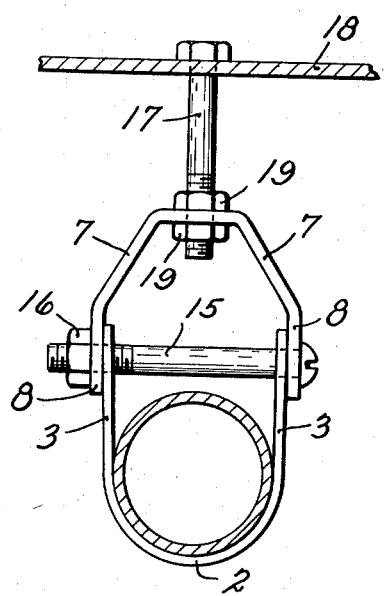
INVENTOR
ROBERT B. DENIS
BY Chapin & Neal
ATTORNEYS

United States Patent Office 2,714,497
Patented Aug. 2, 1955

2,714,497

PIPE HANGER

Robert B. Denis, West Springfield, Mass., assignor to Grinnell Corporation, Providence, R. I., a corporation of Delaware Application July 25, 1951, Serial No. 238,516

1 Claim. (Cl. 248—62)

This invention relates to an improvement in devices for suspending pipes from ceilings or other overhead supports.

It is the principal object of the invention to provide a hanger for the purpose which is stronger and more rigid than hangers now generally in use.

A further object is to secure economy in the manufacture of such hangers by permitting a reduction in the amount of material used in producing a hanger for a given pipe size while maintaining or increasing the overall strength of the hanger.

Other and further objects will be made apparent from the following specification and claim.

In the accompanying drawing which discloses one embodiment of the invention,

Fig. 1 is a front elevational view of the pipe saddle and supporting yoke in position for assembly;

Fig. 2 is a side elevational view of the parts shown in Fig. 1; and

Fig. 3 is a front elevational view showing the parts assembled with a section of pipe in the saddle.

Referring to the drawings the saddle, generally indicated at 1, is shown as comprising a strip of metal bent intermediate its ends to provide a semi-circular seat portion 2 and parallel upstanding arm portions 3. The inner diameter of seat portion 2 is made substantially equal to the outside diameter of the pipe to be supported. The arm portions 3 are each provided adjacent its free end with an opening 4, the opening in one arm being axially aligned with that in the other arm.

The supporting yoke, generally indicated at 5 comprises a strip of metal bent to provide a central horizontal bearing portion 6, outwardly and downwardly inclined spacing portions 7 and downwardly extending parallel portions 8.

The central portion 6 is formed with an opening 9. The parallel portions 8 are each provided adjacent the free end thereof with an opening 10, the opening in one portion being aligned with that in the other portion.

The portions 8 are spaced from each other a distance such that the distance between their adjacent faces is substantially the same as the distance between the outside faces of the portions 4 of the saddle so that the free ends of the yoke can be fitted over the free ends of the saddle, as shown in Fig. 3 with the portions 8 outwardly of the portions 3 and the openings 4 and 10 in alignment. With the parts so positioned, and with a pipe of the same diameter as the saddle seated thereon, as shown in Fig. 3, a bolt 15 is passed through the aligned openings 4 and 10 and secured in place by a nut 16.

The opening 9 is passed over the threaded end of a bolt 17 or similar member depending from the ceiling or other overhead support 18 and the yoke adjustably secured thereon by nuts 19. It will be understood that the order of assembly of the parts will be varied to best meet the conditions of a particular installation.

Considering the stress and strain conditions present in Fig. 3 it will be seen that the weight of the pipe is transmitted to bolt 17 through the inclined portions 7 and that the result is a bending force tending to straighten the portions 7. This tendency of the portions 7 to straighten could be removed by making them vertical and lengthening the center portion 6 to substantially the diameter of the pipe. Such procedure, however, would place an extreme bending force on the lengthened center portion. As a result the art has adopted a compromise by making the center portion as short as possible and reducing the angularity of the yoke arms 7 as much as possible by positioning their ends inwardly of the saddle arms. This latter arrangement while decreasing the bending force in a given instance leaves the ends of the yoke arms free to move towards each other along bolt 15 as the load tends to straighten the arms and once such movement starts it is accelerated by the bending of the cross bolt 15 as the load points at the end of the yoke arms move toward the center of the bolt. Such distortion tends to lower the pipe section carried by the hanger destroying the alignment of the sections and inducing failure of the hanger. Furthermore, as the yoke arms move together it becomes difficult, if not impossible to manipulate the lower nut 19 to adjust the hanger on its suspension bolt for purposes of realignment. To overcome these difficulties the art has made the yoke and saddle of heavier and more expensive metals as the loads have increased. I have found that these difficulties can be overcome by a rearrangement of the parts resulting in a different mode of operation. According to the concept of the present invention an increase in the bending tendency of the yoke arms, by widening the space between them, is accepted to position the yoke arms 8 outwardly of the saddle arms, as shown in Fig. 3, and this increased bending tendency is countered and opposed by the inherent stiffness of the saddle arms 3. The arms 3, which are parallel to each other and "tangent" to the sides of the pipe, support the pipe from the cross bolt 15 without any bending force, the weight of the pipe in fact tends to keep them vertical and parallel. The arms 3 are relatively short, their length being only sufficient to provide working clearance between the pipe and bolt 15 and provide for openings 4. I have found that the resistance to bending of the arms 3 and the load forces tending to keep them parallel far exceed the increase in bending load placed on portions 7 by the increased spacing of portions 8, permitting a substantial reduction in the thickness of metal required.

The relatively greater resistance of the saddle arms to bending as compared to the yoke arms, as well as the efficiency of the arrangement as a whole is illustrated by the fact that in a hanger for a four inch pipe, for example, when constructed according to my invention, the yoke can be formed from a strip 1/4 of an inch thick and 1 1/4 inches wide, while the saddle may be 3/16 of an inch in thickness and of the same width as the yoke.

My improved hanger provides a novel balancing of the working forces which results in an extremely stable hanger which because of the more efficient use of the metal can be produced at less material cost and when once properly assembled maintains the pipe alignment longer and with less fatigue than prior art arrangements.

What is claimed is:

A pipe hanger which comprises a saddle member having a substantially semi-circular seat adapted to receive the pipe to be suspended, a pair of substantially flat, parallel side arms merging substantially tangentially with said semi-circular seat and lying in substantially vertical planes, a yoke member having a central, horizontally disposed bearing portion, intermediate downwardly and outwardly inclined spacing portions integral with the ends of said central portion, and flat parallel end portions integral with the free ends of said intermediate portions and extending vertically downwardly therefrom, the spacing between said end portions being such that said side arms are received therebetween in overlapping contiguous relationship and closely cooperate therewith to provide resistance to inward bending of said end portions, said overlapping portions having aligned openings, a bolt extending through said openings and interconnecting said overlapping contiguous portions, and a nut threaded on said bolt to maintain the two members in snug relationship along the axis of the bolt, so that one end of the yoke member is substantially fixed between the bolt head and an upstanding portion of the saddle member, with the other end substantially fixed between the nut and the other upstanding portion of the saddle member, said relationship also providing that the load of the pipe exert bending forces on the bolt such that the central portion of the bolt tends to bend toward the pipe, and that downward bending of the intermediate and parallel end portions of the yoke member about the bearing portion is minimized, said flat end portions and said side arms being so constructed and arranged as to remain in said contiguous relationship throughout distortion and inward movement along the bolt due to load and thus minimizing the bending moment imparted to the bolt at each side of the hanger, and a suspension means connected with said central bearing portion for support of the hanger.

References Cited in the file of this patent

UNITED STATES PATENTS

| Number | Name | Date |
|---|---|---|
| 591,249 | Emery | Oct. 5, 1897 |
| 624,484 | Haskell | May 9, 1899 |
| 992,338 | Carpenter | May 16, 1911 |
| 1,087,036 | Mitchell | Feb. 10, 1914 |
| 1,450,640 | Norman | Apr. 3, 1923 |
| 1,452,993 | Wack | Apr. 24, 1923 |
| 2,339,564 | Goldberg | Jan. 18, 1944 |